Sept. 27, 1932. H. ST. PIERRE 1,879,584
ANTISKID DEVICE
Filed May 1, 1931
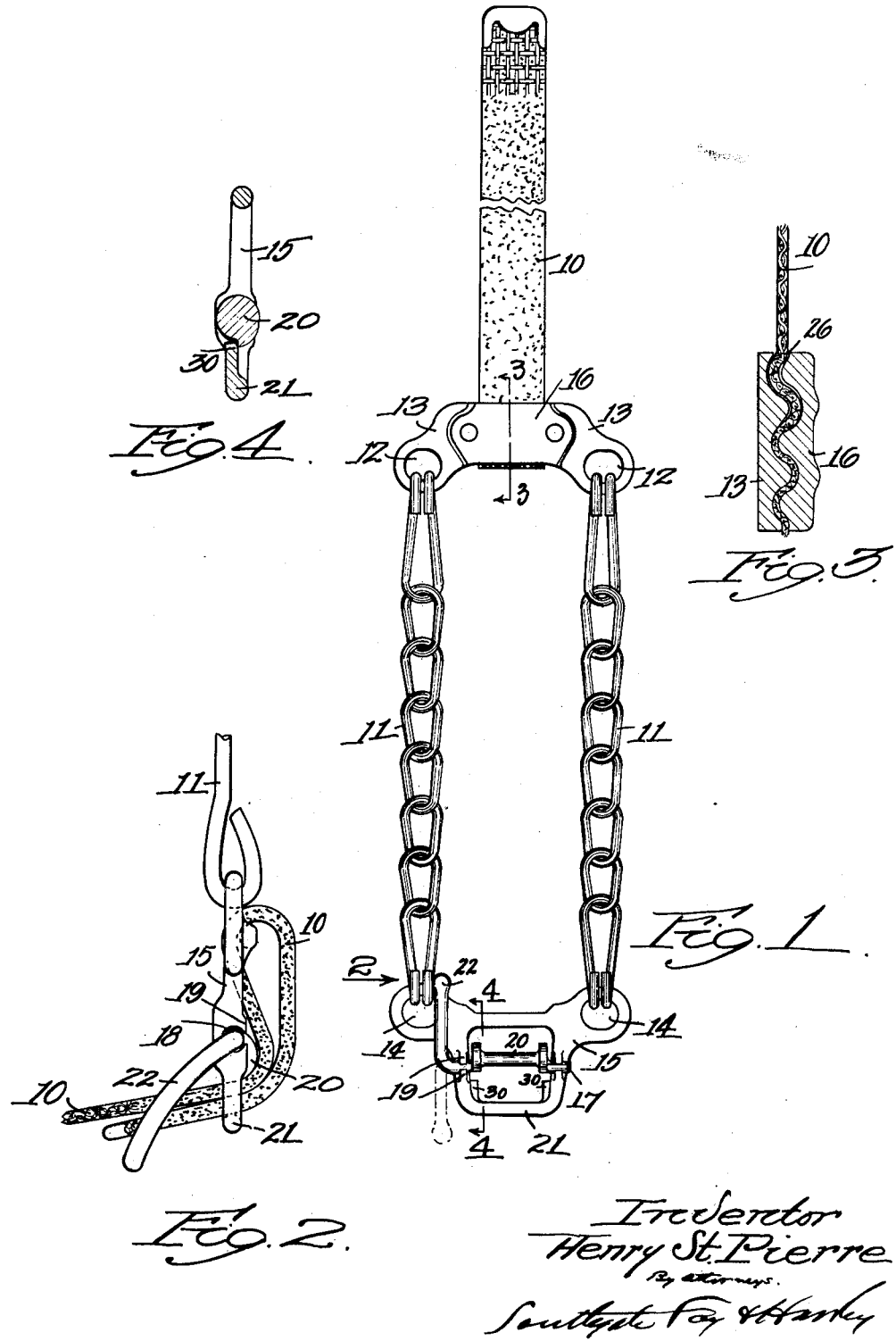
Inventor
Henry St. Pierre Patented Sept. 27, 1932

1,879,584

UNITED STATES PATENT OFFICE

HENRY ST. PIERRE, OF WORCESTER, MASSACHUSETTS

ANTISKID DEVICE

Application filed May 1, 1931. Serial No. 534,304.

This invention relates to an anti-skid device of the type which is adapted to be placed around an automobile tire, in one or more places, in order to enable the operator to get the car out of a bad position. Although it can be used constantly while running the car, that is not the main purpose of it.

The principal objects of the invention are to provide a very strong device for this purpose in which the ordinarily weak portions, that would normally break away, are made so strong that the device will not break in those places; to provide a balanced construction so that there will be little or no tendency for the device to turn around the tire by the action of centrifugal force, but not exactly balanced so that, whatever tendency there is, will move it in such a direction that the detachable fastening means for it will always be located on the front and will not get in the back where it might cause trouble; to provide a construction which involves the use of a textile strap, preferably, for fixing it on the tire and that strap can be made very strong and durable; to provide means for attaching the strap to the metal part in such a way that the strain will be distributed so that the strap will not be cut at the point at which it emerges from the metal construction, and to provide an improved buckle or detachable fastening device in which the strap is secured firmly and the more strain that is put on it the more firmly it will hold and yet it will be very easily detached.

Other objects and advantages of the invention will appear hereinafter.

Reference is to be had to the accompanying drawing, in which

Fig. 1 is a view of a preferred form of the device laid out on a flat surface;

Fig. 2 is a side view of the buckle shown in its locked position;

Fig. 3 is a sectional view on the line 3—3 of Fig. 1, and

Fig. 4 is a sectional view on the line 4—4 of Fig. 1.

This device is shown in the form of a so-called "mud-hook" having a strap 10 of very strong textile material, preferably woven on a narrow ware loom, and capable of resisting any force to which it may be subjected in its use for this purpose. This strap is a simple straight strap adapted to be passed around the inner surface of the rim and passing between two spokes.

The anti-skid portion of the device comprises a pair of chains 11 or other flexible means for preventing skidding shown arranged parallel to each other. They are hooked at one end in a pair of perforations 12 in a metal clamp 13 and at the other into a pair of perforations 14 in a buckle 15. It will be understood that the two chains 11 located on the outside of the wheel come into contact with the ground in the usual way so as to assist the driver in getting out of a slippery place or mud hole or the like. One chain, however, can be used within the scope of some of the claims.

The clamp 13 has a cover plate 16 riveted thereto around the end of the strap 10. There is a channel in each of these members 13 and 16, of a sinuous or toothed shape, in which the space for the strap 10 gradually widens from one end to the other. The wide end is the one into which the strap enters. The object of this construction is to securely hold the strap and also to provide it with more of a grip to be applied to the strap at the end furthest from the free portion thereof. If this were not so the strap would be gripped at the point 26 and, all the strain coming there, it would be apt to give away and break at that point. According to this construction, this strain is distributed and the pressure of the clamping members 13 and 16 on the strap 10 takes place all the way from one side of this clamp to the other and is more intense at the side toward the outer end of the strap. At no place is there a point where the strap is gripped absolutely and thus weakened.

At the opposite end the strap is brought through the parts of the buckle 15 in the manner shown in Fig. 2. The buckle is formed of a piece of metal having a square or rectangular opening through which the strap passes three times. At one side is an outer bar 21. Across a point at about the center of this opening is a shaft 17 and the frame of the buckle 15 is provided with depressions 18 serving as bearings for this shaft and projections 19 completing the bearings, although these bearings are not covered. The shaft is journalled loosely in the bearings thus formed and it is provided with an eccentric portion 20 extending practically across the buckle and adapted to come down as shown in Fig. 2, into contact with the strap to hold it against the outer bar 21 of the frame 15 of the buckle when the parts are in locked position.

In the use of the device, the chains are placed on the outside of the wire, the strap passed through the inside of the rim and between two spokes of the wheel. The end of the strap is passed between the eccentric 20 and the bar 21 from the back, as shown in Fig. 2 and drawn up. It will be understood that at this time the eccentric 20 is in inoperative position and its handle 22 is in the position shown in Fig. 1. The end of the strap is then passed down again through the buckle between the eccentric and the opposite or inner bar of the buckle. Now it is drawn up as tight as possible and the end of the strap is passed in through the space between the strap itself and the bar 21 where it comes out on what may be considered the outer side of the buckle, as appears in Fig. 2. This is drawn as tight as possible and the handle 22 is then turned half way around so that the eccentric 20 binds the two layers of the strap between it and the bar 21. The turning of the eccentric takes up additional slack in the strap and binds it firmly. Stops 30 limit the motion of the eccentric.

Now it will be seen that any force, tending to pull the strap away from this buckle, also tends to pull the eccentric down further toward the plane of the buckle and toward the bar 21. Therefore, this construction will not be loosened by a pull on the strap which, of course, is an action that it will be subjected to. On the other hand when it is desired to loosen it, that is done very easily by pulling up the handle 22 and pushing it over to the position shown in Fig. 1. In fact it is not necessary to push it over as it will snap itself further around after it has been moved through a quarter of a circle.

It will be seen also that the clamp 13 with the cover plate 16 and the whole of the buckle are made of practically the same weight but with a little less weight on the buckle than on the clamp. Thus any centrifugal force tending to turn the article on the wheel, if it is used much for driving, will tend to keep the device almost constant but, if it does move, the buckle, which is on the outside, will move outwardly with respect to the hub and away from a position in which it might come in behind the wheel where the space is limited.

Although I have illustrated and described only one form of the invention, I am aware of the fact that modifications can be made therein by any person skilled in the art without departing from the scope of the invention as expressed in the claims. Therefore I do not wish to be limited in this respect but what I do claim is:

1. In an anti-skid device for automobile tires, the combination of a strap, a clamp for holding one end of it positively, a buckle to which the free end of the strap is adapted to be detachably connected and a chain connecting the clamp and buckle, said clamp and buckle being nearly of the same weight, whereby centrifugal force will not tend to advance either of them outwardly on the wheel to any material extent.

2. In an anti-skid device, the combination of a strap, a clamp fixed to the end of said strap, said clamp comprising a back member having means at opposite ends for the attachment of chains and a cover plate rigidly fixed thereto, a buckle to which the free end of the strap is adapted to be detachably connected and having, at its end, means for holding the opposite end of the chain, and a chain connected between the clamp and buckle, the weights of the clamp and the buckle being substantially the same but that of the clamp being a little greater than that of the buckle.

3. In an anti-skid device, the combination of a textile strap, a clamp fixed to the end of said strap, said clamp comprising a back member having means at opposite ends for the attachment of chains and a cover plate rigidly fixed thereto, a buckle to which the free end of the strap is adapted to be detachably connected and having, at its opposite ends, means for holding the opposite ends of the two chains, and a pair of chains connected between the clamp and buckle, the weights of the clamp and the buckle being substantially the same but that of the clamp being a little greater than that of the buckle, whereby any creeping of either of these parts due to centrifugal force, will not result in the buckle getting in behind the wheel.

4. In an anti-skid device, the combination of a strong flexible textile strap, a clamp having means for the attachment of a chain and a cover for the clamp fixed rigidly to the clamp, the cover and clamp having a passage between them involving changes in direction and gradually growing narrower toward the end of the strap which is secured to the clamp, whereby there will be no point along the strap at which all the clamping power is concentrated but the clamp will hold and retain the strap at all points through the clamp.

5. As an article of manufacture, an anti-skid device comprising a textile strap and a clamp in which one end of the strap is secured, said clamp comprising a back plate and a cover plate rigidly riveted together, the back plate and cover plate having registering sinuous passages across the same gradually growing wider from the side from which the free end of the strap extends, for the purpose described.

6. In an anti-skid device, the combination of a textile strap, a clamp having two parts between which one end of the strap is rigidly secured, a buckle to which the free end of the strap is adapted to be detachably connected and a chain extending from the clamp to the buckle.

In testimony whereof I have hereunto affixed my signature.

HENRY ST. PIERRE.